W. PFEIFER.
AUTOMATIC LUBRICATOR.
APPLICATION FILED MAR. 2, 1910.

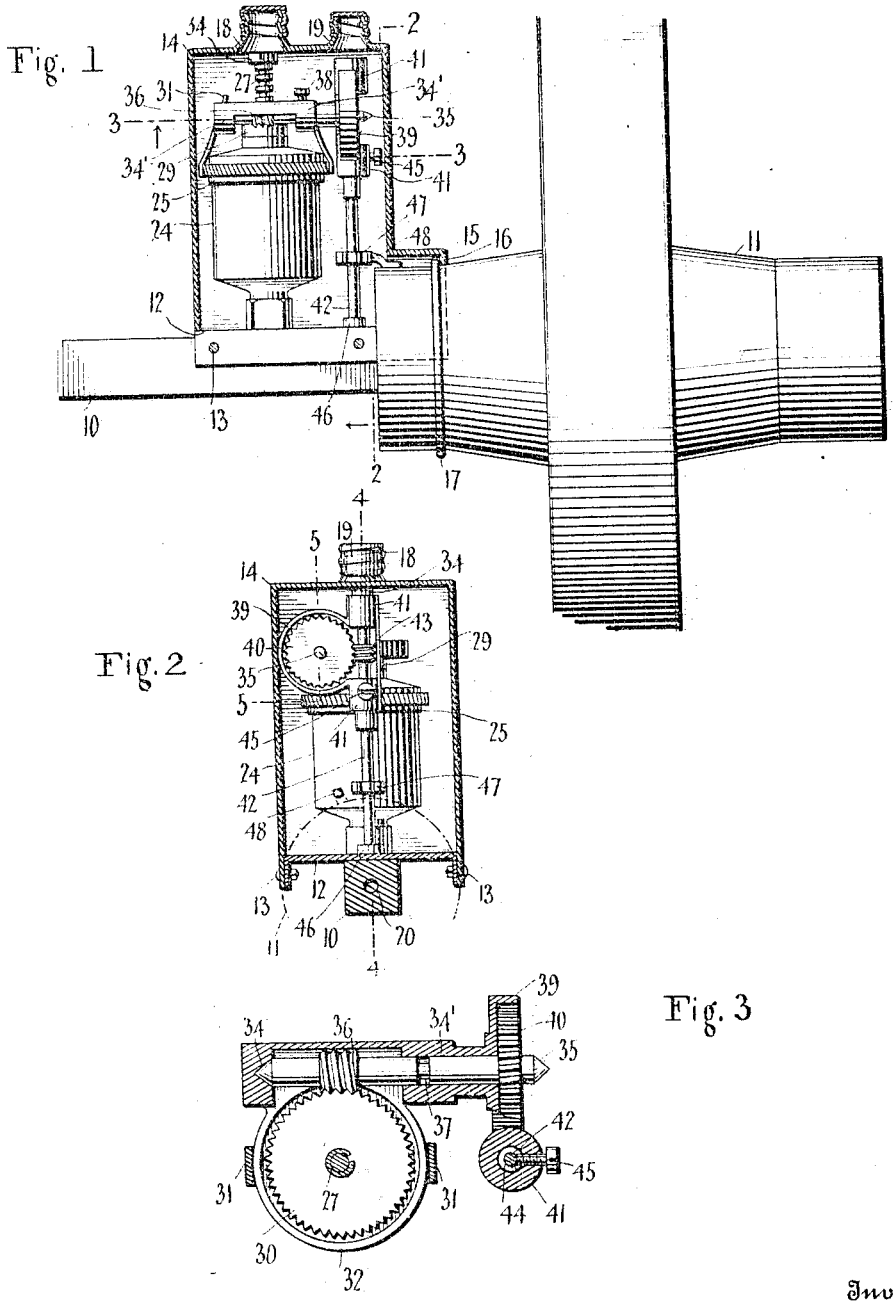

960,696.

Patented June 7, 1910.

2 SHEETS—SHEET 2.

Witnesses

Inventor
Willis Pfeifer
By Chandler & Chandler
Attorneys

UNITED STATES PATENT OFFICE.

WILLIS PFEIFER, OF SIMPSON, KANSAS.

AUTOMATIC LUBRICATOR.

960,696.

Specification of Letters Patent.  Patented June 7, 1910.

Application filed March 2, 1910.  Serial No. 546,868.

*To all whom it may concern:*

Be it known that I, WILLIS PFEIFER, a citizen of the United States, residing at Simpson, in the county of Mitchell, State of Kansas, have invented certain new and useful Improvements in Automatic Lubricators; and I do hereby declare the following to be a full, clear, and exact description of the invention, such as will enable others skilled in the art to which it appertains to make and use the same.

This invention relates to lubricators and has special reference to a force feed axle lubricator.

The principal object of the invention is to provide a lubricator of this description in which the feeding mechanism may be readily removed for the purpose of refilling the grease cup.

With the above and other objects in view, as will be hereinafter apparent, the invention consists in general of certain novel details of construction and combinations of parts hereinafter fully described, illustrated in the accompanying drawings, and specifically set forth in the claims.

Figure 4:
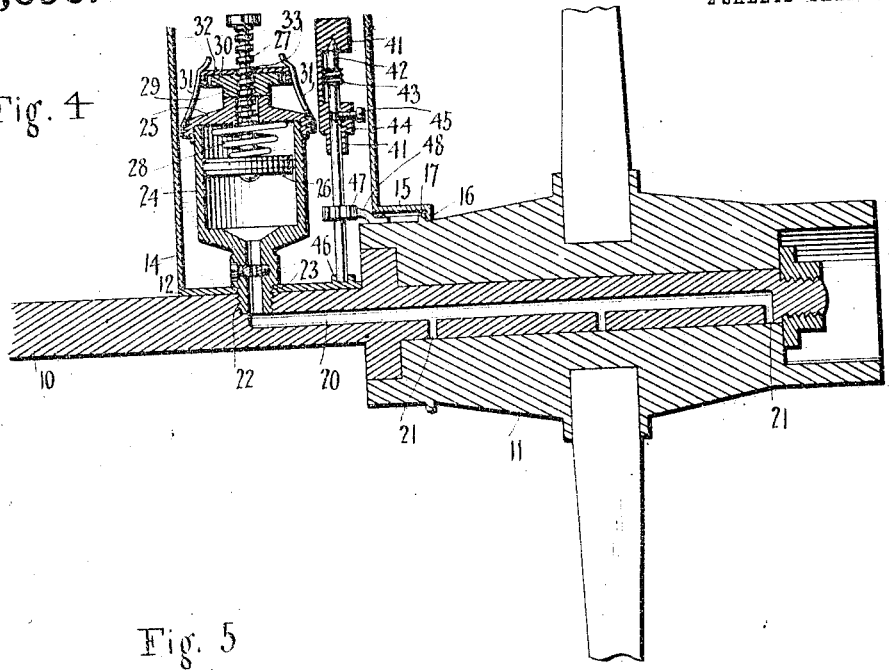
Figure 5:
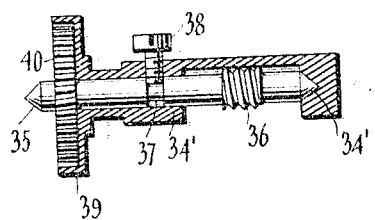
Figure 6:
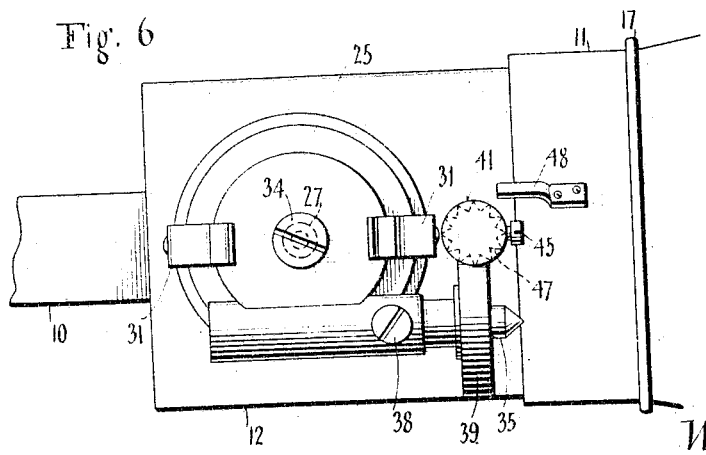

In the accompanying drawings, like characters of reference indicate like parts in the several views, and Figure 1 represents a side elevation of a portion of an axle and wheel hub equipped with this invention, certain of the parts being shown in section the better to disclose the mechanism. Fig. 2 is a section on the line 2—2 of Fig. 1. Fig. 3 is a section on the line 3—3 of Fig. 1, the section being taken looking upward. Fig. 4 is a section on the line 4—4 of Fig. 2. Fig. 5 is a detail section on the line 5—5 of Fig. 2. Fig. 6 is a top plan view of a lubricator with the protective casing removed.

The numeral 10 indicates a portion of one end of a vehicle axle and on this axle is journaled a wheel hub, a portion of which is indicated at 11. Secured to the axle adjacent the wheel hub is a base plate 12 constituting the means for attaching the protective casing to the axle. Fastened to this base plate 12 by means of bolts 13 is a protective casing 14 the body of which is rectangular in form and which is provided with a segmental portion 15 projecting over the wheel hub 11 and having a downwardly turned lip 16 which engages over a rib 17 formed on the wheel hub. The top of this casing 14 is provided with capped openings 18 and 19 for purposes hereinafter to be described, the opening 19 being nearer the end of the casing toward the wheel hub than the opening 18. Through the axle 10 extends an oil passage 20 which leads into the axle journal within the wheel hub and is there provided with suitable discharge openings 21. The end of this oil passage is provided with a threaded opening 22 and an opening 23 is formed in the base plate 12.

A compression grease cup is indicated at 24 and this grease cup is provided with the usual cap 25, plunger 26 and plunger stem 27. This plunger stem 27 is threaded and between the plunger 26 and cap 25 is a spring 28. Above the cap 25 the plunger is provided with a nut 29 and by the rotation of this nut the plunger is forced down by the action of the spring or forced up against said action. Fixed to this nut 29 is a plunger nut worm wheel 30, the rotation of the worm wheel thus effecting the movement of the plunger. Diametrically disposed on the cap 25 are spring clips 31 provided with inwardly turned ends which lie in closely spaced relation immediately above the periphery of the worm wheel 30.

In order to actuate the worm wheel 30 there is provided a worm wheel cap 32 having an opening 33 formed centrally thereof, which opening fits over the plunger stem 27 and is held from removal by a screw 34 threaded into the end of the plunger stem. This screw ordinarily permits movement of the worm wheel cap along the plunger but the spring clips 31 serve to hold the cap close down on the worm wheel 30 by extending over the edges of the cap.

On the cap 32 are formed bearings 34' for a shaft 35 provided with a worm 36. This shaft is grooved as indicated at 37 and through one of the bearings passes a set screw 38 which engages in the groove 37 and holds the shaft from longitudinal movement in said bearings while permitting its rotation. At the end of one of these bearings is a casing 39 similar in shape to the cap 32 and in this casing on the shaft 35 is fixed a worm wheel 40. The casing 39 is provided with bearings 41 similar to the bearings 34' but the first mentioned bearings are horizontally disposed while the bearings 41 are vertically arranged. In the bearings 41 is a shaft 42 provided like the shaft 35 with a worm 43, groove 44 and set screw 45. The shaft 42 extends downward and has its lower end journaled in a bearing 46 formed in the base. Adjacent its lower end is a star wheel 47 and on the wheel hub 11 is fixed a finger 48 arranged to contact with and rotate the star wheel as the hub is rotated on the axle.

The capped opening 18 lies immediately above the plunger screw 34 and the capped opening 19 lies above the shaft 42 so that any needful access may be had to these parts of the mechanism without removing the entire protective casing.

In the operation of the device the grease cup is filled with grease and the cap screwed on. At this time the plunger is positioned at the top of the grease cup. The plunger screw 34 is removed and the actuating worms and shafts positioned over this screw, the cap 32 being forced down until held in position by the springs. The screw 34 is placed in position and it will be noted that when the parts are properly assembled the lower end of the shaft 42 is held in the bearing 46. As the vehicle moves over the ground the finger 48 strikes the star wheel 47, rotates the shaft 42 and this shaft, through the medium of the worms, worm wheels and shaft 35, actuates the plunger nut so that the plunger is gradually released and allowed to move down under the action of the spring, thus forcing the grease through the oil passage and lubricating the inside of the wheel hub.

There has thus been provided a simple and efficient device of the kind described and for the purpose specified.

Having thus described the invention, what is claimed as new, is:—

1. The combination with an axle, a wheel hub mounted thereon, and a force feed grease cup mounted on the axle and including a threaded plunger stem and a nut on said stem; of a gear on said nut; a projection on said hub, and a driving mechanism for said gear including a shaft having a star wheel mounted thereon and adapted to lie in the path of said projection, a cap fitting on said stem and covering said gear; and means to hold said cap removably on the stem, said means comprising spring arms attached to said grease cup and having inwardly directed ends engaging over the cap when the latter is in position.

2. In a device of the kind described, an axle provided with an oil passage, a grease cup mounted on said axle and communicating with the oil passage, a grease cup cap closing the upper end of said grease cup, a plunger in said grease cup, a stem fixed to said plunger and extending through said cap, a nut on said stem above said cap, a gear fixed to said nut and above the same, a cap provided with a central opening mounted on said stem and covering said gear, spring arms attached to the cap of the grease cup and having inwardly directed ends engaging over the cap of the gear when the latter is in position, bearings formed on said cap, a shaft journaled in said bearings, a worm on said shaft engaging with the gear when the cap is in position, a worm wheel on the end of said shaft, a casing surrounding said worm wheel, bearings formed on said casing, a second shaft carried in said bearings and extending downward alongside of said grease cup, said second shaft having its lower end journaled in the axle, a worm on the second shaft meshing with the worm wheel on the first shaft, a star wheel on the second shaft, a wheel hub mounted on said axle, and a projection fixed on the wheel hub and adapted to contact with the star wheel as the hub revolves on the axle.

In testimony whereof, I affix my signature, in presence of two witnesses.

WILLIS PFEIFER.

Witnesses:
E. J. FOOTE,
IVA BURNS.